United States Patent [19]
Kim et al.

[11] Patent Number: 5,420,577
[45] Date of Patent: May 30, 1995

[54] METHOD FOR PROVIDING COMMUNICATION BETWEEN A DISTRIBUTION PANEL AND CONSOLE INTERFACE UNITS

[75] Inventors: Charles C. Kim, Niles; Robert D. Woodhouse, Elgin, both of Ill.

[73] Assignee: Motorola, Inc., Schaumburg, Ill.

[21] Appl. No.: 55,452

[22] Filed: May 3, 1993

[51] Int. Cl.⁶ ............................................. H04Q 9/00
[52] U.S. Cl. ...................... 340/825.520; 340/825.07; 340/825.16; 340/825.54; 340/825.08; 455/8; 455/9; 455/14; 455/17
[58] Field of Search .................. 340/825.07, 825.08, 340/825.52, 825.54, 825.16; 455/7, 9, 14, 17, 13.1, 56.1, 8; 379/63; 371/7

[56] References Cited

U.S. PATENT DOCUMENTS

| | | | |
|---|---|---|---|
| 4,218,690 | 8/1980 | Ulch et al. | 340/825.31 |
| 4,683,531 | 7/1987 | Kelch et al. | 340/825.08 |
| 4,817,190 | 3/1989 | Comroe et al. | 340/825.52 |
| 5,164,986 | 11/1992 | Bright | 380/21 |

Primary Examiner—Michael Horabik
Attorney, Agent, or Firm—Nedra D. Karim; Timothy W. Markison; James A. Coffing

[57] ABSTRACT

In a secure trunked communication system that includes a central controller, communication between a distribution panel and a limited number of console interface units may be achieved in the following manner. At power up or upon a reset condition, the distribution panel transmits a status check message to each console interface unit in the system. Console interface units that are active respond by transmitting an acknowledgement. Upon receiving the acknowledgement, the distribution panel transmits the addresses of the active console interface units to the central controller. When the distribution panel receives secure information from the central controller, it interprets the information to identify a target console interface unit and transmits the received secure information to the target console interface unit.

5 Claims, 3 Drawing Sheets

001
METHOD FOR PROVIDING COMMUNICATION BETWEEN A DISTRIBUTION PANEL AND CONSOLE INTERFACE UNITS

FIELD OF THE INVENTION

This invention relates generally to secure trunked communication systems and, in particular, to communication between a distribution panel and console interface units within a secure trunked communication system.

BACKGROUND OF THE INVENTION

As is known, secure conventional communication systems provide a medium for users to transmit and receive sensitive information without the risk of eavesdropping by unauthorized parties. In a secure conventional communication system, users manually load a key variable (used in the encryption process) into each communication unit by physically attaching a key variable loader to the unit. In addition, each unit was only capable of storing one key. This limitation, complicated key management in a system by making periodic key changes and interoperability of groups that normally use different key variables difficult. To provide for more efficient key management, multi-key and over-the-air-rekeying (OTAR) were developed.

Multi-key is the storing of multiple key variables within a secure device, i.e. subscriber unit, console interface unit, or encode/decode station. The secure device loads the appropriate key into an encryption/decryption hybrid, based on the assigned channel. Key indexing is an optional feature whereby the keys within a subscriber unit are partitioned into two groups of indexes. One index is active and used for voice, while the other index can be rekeyed.

OTAR allows a fixed computer to send new key variables over the air to the communication units. This feature eliminates the need to physically attach a key variable loader to each communication unit, thus increasing both the efficiency and security of the rekeying process. For additional security, OTAR can be performed on one communication unit at a time or, for convenience, with groups of communication units.

To support multi-key or OTAR, a secure conventional communication system comprises a distribution panel, a key management controller (KMC), a limited number of console interface units (CIUs), a console, and a plurality of repeaters. The distribution panel routes messages between the KMC and the CIUs such that the CIUs store key variables for the console. The CIUs use the key variables to encrypt clear audio from the console and routes the encrypted audio to the repeater for broadcast to the communication units associated with that repeater. The CIUs also use the key variables to decrypt encrypted audio received by the repeaters and routes the clear audio to the console. As discussed above, the KMC manages the key variables (keys used to encrypt and decrypt voice/data) in the system.

In the secure conventional communication system with multi-key and OTAR, communication units and CIUs are able to perform the multi-key function (loading of an appropriate key) based on the assigned channel. This is done when the KMC transmits the OTAR information which includes the key variables to a CIU that is associated with the assigned channel. The selected CIU transmits the information to its associated repeater and the repeater transmits the OTAR information to the associated communication units.

Secure trunking communication systems are known to comprise communication units, a central controller, and a plurality of repeaters. Typically, the central controller performs all system wide functions in the communication system, such as call processing, assignment of voice/data channels, and establishment of the control channel repeater. However, because the communication channels are constantly allocated to different groups of communication units, consoles are not readily used due to the large amounts of information needed to establish secure communications with a console. This results because a console must be able to talk on each channel to any group of communication units in a real time fashion. Thus requiring the console to continually monitor the control channel for a channel and group assignments. This adds a substantial amount of congestion to the processing of system operational data, i.e. the data required to set up secure communications.

Therefore a need exits for a method of reducing the required communications between the central controller and the CIUs thus making secure communications via a console more practical.

BRIEF DESCRIPTION OF THE DRAWINGS

FIGS. 2-1 and 2-2 illustrate a logic diagram that may be used to implement the present invention.

DESCRIPTION OF A PREFERRED EMBODIMENT

Generally, the present invention provides a method for a distribution panel to communicate with a limited number of console interface units (CIUs) within a secure trunking communication system. This is accomplished by determining at power up or at a reset condition, the status of the CIUs. To check the status, the distribution panel transmits a status check message to each CIU in the system. Upon receipt of the status check message, each active CIU transmits an acknowledgement message to the distribution panel. Once the status has been determined, based on acknowledgments received by the distribution panel, the distribution panel reports the status of each CIU to the central controller. The central controller then updates its CIU status log. During normal operation, the distribution panel periodically checks the status of the CIUs and reports any status changes to the central controller. When changes occur, the central controller again updates its CIU status log.

Also, during normal operation the distribution panel receives secure communication information, such as channel number and key assignment messages, from the central controller, decodes the messages, and routes the secure communication information to the target CIU. In this manner, the CIU is utilized for encrypting and decrypting voice communications for a console unit and substantially reduces the required communications to establish a secure communication with a console.

Figure 1:
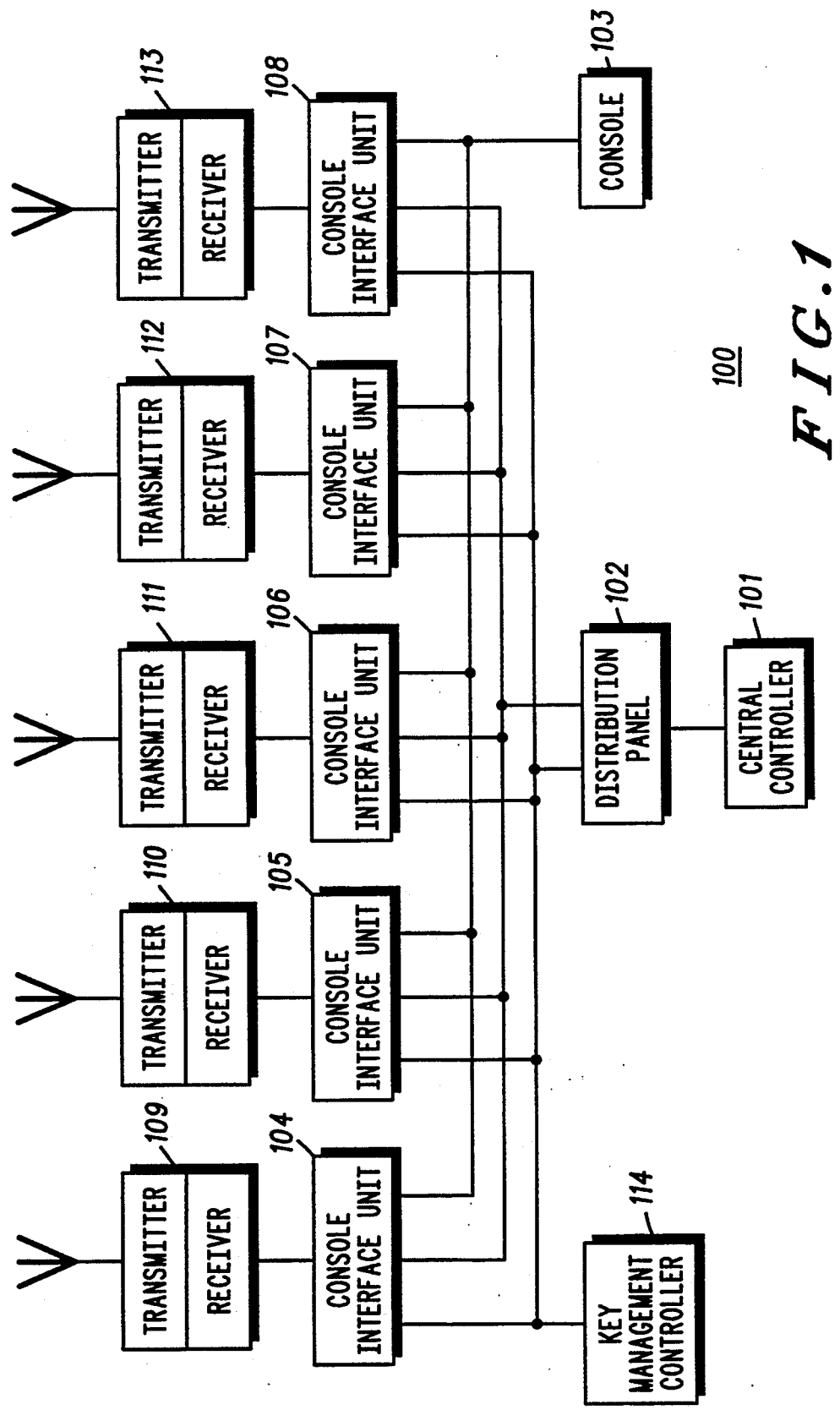
FIG. 1 illustrates a secure trunking communication system in accordance with the present invention.

The present invention can be more fully described with reference to FIGS. 1 and 2. FIG. 1 illustrates a secure trunking communication system (100) that comprises a central controller (101), a distribution panel (102), a console (103), console interface units (CIUs) (104–108), repeaters or base stations (109–113), and a key management controller (KMC) (114).

The central controller (101) is responsible for managing the trunking system. It communicates to the communication units in the system via a dedicated control channel, processes call requests and assigns voice or data channels as required. The central controller (101) interfaces to the repeaters and keys them up when they are assigned to a call. The central controller (101) interfaces with the CIUs (104–108), via the distribution panel (102), to indicate which key to use for each secure voice call and to indicate which channel is to facilitate over-the-air re-keying functions.

The distribution panel (102) is a known software driven device that connects the control links of the CIUs (104–108), the central controller (101), and the key management controller (114). The distribution panel (102) translates between the various protocols and routes required messages to the appropriate component. For a secure voice call, the distribution panel (102) receives a key assignment message from the central controller (101) and sends the key variable identifier to a CIU (104–108). For re-keying operations, the distribution panel (102) receives a channel request message from the key management controller (114) and sends the request to the central controller (101). When a re-keying channel is granted by the central controller (101), the distribution panel (102) passes the channel grant message to the key management controller (114) and sends a message to the assigned CIU (104–108) that the assigned CIU (104–108) should enter a mode to modulate re-keying messages rather than encrypt or decrypt voice messages.

The console (103) provides the user with a direct voice and control link to the rest of the infrastructure. In some markets, the console (103) is used as a dispatch point in a one-to-many configuration. In other markets, it is used as a monitoring point. In either case, the console (103) allows a user control over the infrastructure units. The operation of the console (103) is known, thus no further discussion will be presented except to facilitate the understanding of the present invention.

A plurality of CIUs (104–108) are the interface between the encrypted part of the system and the clear part for the console. The CIUs (104–108) decrypt repeater (109–113) received audio before sending it to the console (103) and encrypt console (103) transmitted audio before sending it to the repeater (109–113). Additionally, the CIUs (104–108) encode over-the-air-rekeying messages from the key management controller (114) into Motorola Data Communication 1200 format for transmission and decode received Motorola Data Communication 1200 messages before routing them to the key management controller (114). As shown, the CIUs (104–108) are tied on a common bus to the distribution panel (102).

The base stations, or repeaters, (109–113) provide the interface between the central controller (101) and portable or mobile communication units. The repeaters (109–113) also route the received audio to the CIUs (104–108) and transmit the CIUs'(104–108) sourced audio. In each repeater (109–113), a transmitter and receiver are paired. There are 2 modes of operation for each repeater (109–113), either as control channel or as voice/data channel. In a secure trunked system, only one repeater (109–113) is a control channel while the rest are voice/data channels.

The key management controller (114) is a computer which manages the keys in a communication system. The KMC (114) maintains a database of the users in the system, which includes the keys that are in each unit. It also stores and generates the over-the-air-rekeying messages. It interfaces with the trunking system through the distribution panel (102) so that it can request a channel for re-keying operations.

Figures 1, 2:
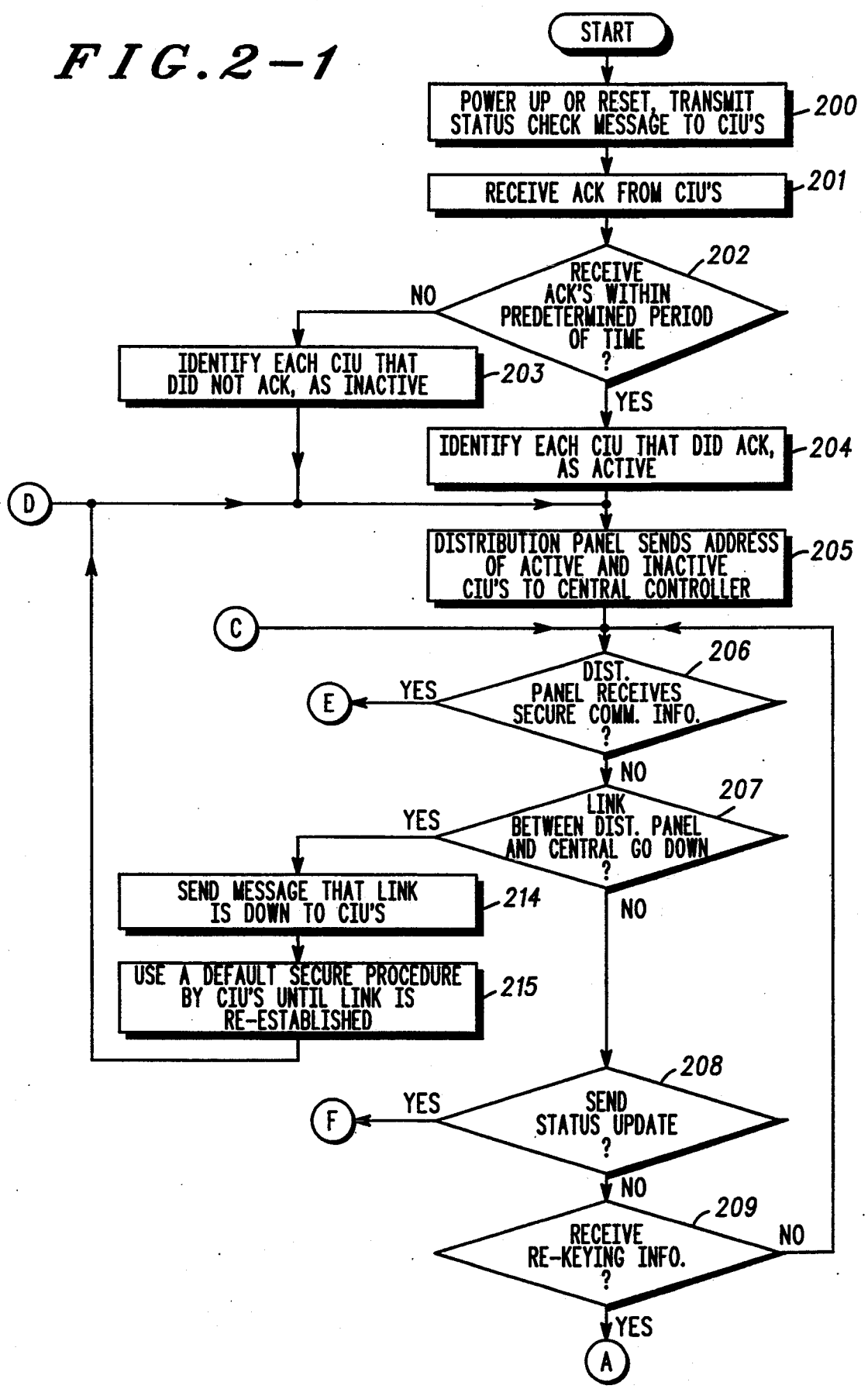
Figure 2:
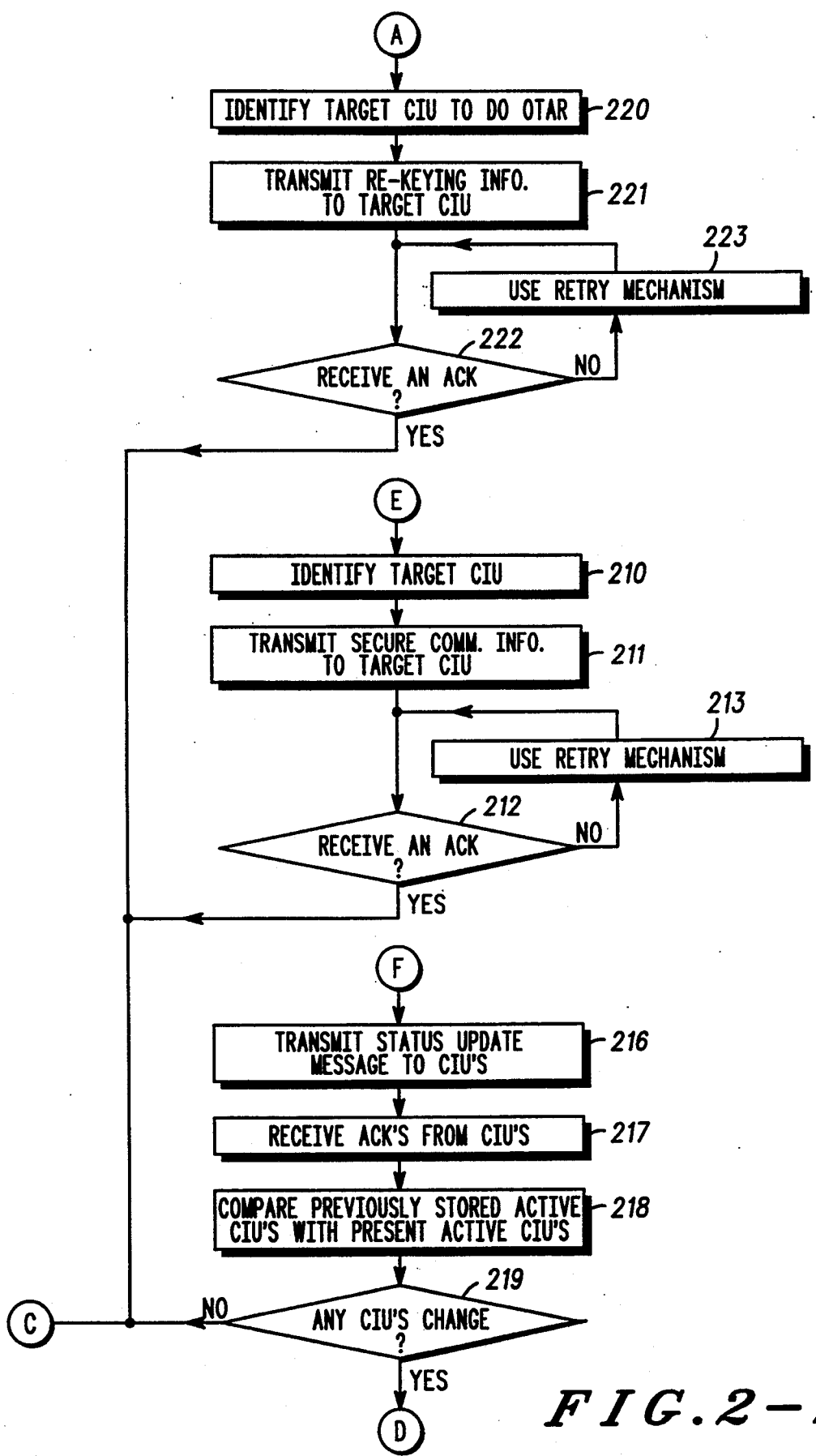

FIGS. 2-1 and 2-2 illustrate a logic diagram that may be used by the distribution panel and the CIUs to implement the present invention. At step 200 the distribution panel is powered up, or reset, and transmits a status check message to each CIU in the system. The status check message is a message that contains 1) address of the CIU, 2) a code which indicates that the message is a status check message, and 3) a message checksum. The CIU whose address is included in the status check message is expected to respond with an acknowledgement message. The distribution panel starts a timer, which establishes a predetermined period of time, and waits to receive an acknowledgement from the addressed CIU (201). The presence or absence of a CIU acknowledgement of the status check message within the predetermined period of time will determine whether the CIU is active or inactive.

Active CIUs acknowledge the status check message whereas inactive CIUs do not. The predetermined period of time is typically the amount of time required for the distribution panel to transmit the status check message plus the amount of time for the CIU to receive the message and transmit an acknowledgement to the distribution panel. For purposes of this discussion, 10 milliseconds will be used as the predetermined period of time. Each CIU that the distribution panel receives the acknowledgement from within 10ms of transmitting the status check message (202), is identified as active (204). Each CIU that the distribution panel does not receive the acknowledgement from within 10 ms of transmitting the status check message (202), is identified as inactive (203). The distribution panel stores a list of active and inactive CIUs. The distribution panel sends the status (active or inactive) of each CIU to the central controller so that the central controller does not assign secure communication channels to those channels that do not have an active, or operational, CIU.

Once the system is up and running, the distribution panel 1) waits to process either secure communication information (206); 2) monitors the link between the distribution panel and the central controller (207); 3) sends status updates to the central controller (208); or 4) processes re-keying information (209).

If the distribution panel receives secure communication information (206), it processes the information and identifies the target CIU and the key number (210). The secure communication information is a number between 0 and 511, inclusive, that indicates the number of a secure key which is to be used by the target CIU to encrypt or decrypt a voice communication. The distribution panel transmits the secure communication information (key number) along with the address of the target CIU to the target CIU (211). In this manner, only the target CIU acts upon the secure communication information by performing an action indicated in the secure communication information..

The action performed may be the known action of the target CIU using the key number to locate a secure key in the CIU's electronic memory. The secure key is installed in an encryption/decryption device within the CIU to facilitate secure voice communications. The CIU transmits an acknowledgement to the distribution panel indicating the secure communication information was received. If the distribution panel receives the acknowledgement from the target CIU before the predetermined period of time (10 ms) (212), normal operation is continued at step 206. If the distribution panel does not receive the acknowledgement from the target CIU within 10 ms, the distribution panel utilizes a retry mechanism (213). For purposes of this discussion, the retry mechanism consists of the distribution panel attempting as many as two retransmissions of the secure communication information until the target CIU acknowledges properly or fails to acknowledge. Each retransmission is separated in time by about 10 milliseconds (the predetermined period of time). If the target CIU acknowledges the transmission or retransmissions properly, it remains as an active CIU. If the target CIU fails to acknowledge the transmission and retransmissions, the distribution panel identifies the target CIU as inactive and transmits an update status message to the central controller.

If the distribution panel detects the absence or malfunction of the central controller through its established communication protocol, i.e. the link failed, (207), the distribution panel uses a broadcasting address to broadcast to all CIUs in the system that the central controller link is down (214). Upon receipt of the broadcast message, each active CIU performs a default secure procedure which entails loading a default secure key (215) until the CIU receives a message to load some other secure key. The default secure key is typically the same for all CIUs in the system.

Periodically, the distribution panel checks the status of the CIUs in the system. If the distribution panel is to perform a status check (208), the distribution panel transmits a status update message to each CIU in the system (216). The presence or absence of a CIU acknowledgement of the status update message within the predetermined period of time will determine whether the CIU is active or inactive. The distribution panel receives acknowledgements from all CIUs that are active in the system (217). The distribution panel compares the previously stored list of active CIUs with present active CIUs (based on CIUs which transmitted an acknowledgement) (218). If the previous list of active CIUs does not match the present active CIUs (219), the distribution panel transmits the status (active or inactive) of each CIU that had a status change to the central controller (205) so that the central controller does not assign secure communication channels to those channels that do not have an operational CIU.

For each CIU whose last status was active and whose present status is inactive, the distribution panel transmits a CIU inactive message to the central controller. For each CIU whose last status was inactive and whose present status is active, the distribution panel transmits a CIU active message to the central controller. The distribution panel may not transmit a message for CIUs that did not have a change in status and continues with normal operation (206).

If the distribution panel receives re-keying information (209), the distribution panel identifies the target CIU (220) and transmits the re-keying information message to the key management controller and the target CIU (221). Re-keying information consists of an Over-The-Air-Rekeying (OTAR) channel assignment message from the central controller. The target CIU may be used as a path for secure voice or for over-the-air-rekeying. The distribution panel sends messages to the target CIU to switch operation between secure voice to over-the-air-rekeying. The target CIU that received the OTAR channel assignment message transmits an acknowledgement to the distribution panel and changes its operating mode to Motorola Data Communication (MDC) 1200 signalling. In this mode the target CIU encodes and decodes re-keying messages to and from the key management controller.

As is known, the signalling scheme for the re-keying operation is resident in the CIU along with the secure voice scheme. The message issued by the distribution panel commands the target CIU to enter over-the-air-rekeying mode. A different message commands the target CIU to exit over-the-air-rekeying mode and re-enter secure voice mode.

After transmitting the re-keying information to the target CIU, the distribution panel waits for the acknowledgement from the target CIU. If the distribution panel receives the acknowledgement within the predetermined period of time (222), it continues with normal operation (206). If the distribution panel does not receive the acknowledgement within the predetermined period of time (222), the distribution panel utilizes a retry mechanism (223). For purposes of this discussion, the retry mechanism consists of the distribution panel attempting as many as two retransmissions of the same message until the target CIU acknowledges properly or fails to acknowledge at all. The retransmissions are separated in time by about 10 milliseconds. If the target CIU acknowledges the transmission or retransmissions properly, then it remains as an active CIU. If target CIU fails to acknowledge the transmission and retransmissions, the distribution panel identifies the target CIU as inactive and transmits a message to the central controller indicating the target CIU as inactive.

Since the distribution panel transmits at least status update messages to the CIUs periodically, the active CIUs will detect a distribution panel failure if a message has not been received within a predetermined period of time (longer than the number of CIUs multiplied by 10 milliseconds). When a distribution panel failure is detected, each CIUs loads a default secure key until the CIU is commanded to load some other secure key. The default secure key is typically the same for all CIUs in the system.

The present invention provides a method for a distribution panel to communicate with CIUs in a secure trunked communication system. This allows a set of secure features to be employed in a trunking environment. It also allows the assignment of one of several encryption keys to a trunked secure voice call. Also, a key management controller is able to request a channel for rekeying operations on a secure trunked channel. By relieving the distribution panel of the task of translating messages between various components within the system, throughput is significantly increased, i.e. congestion of processing secure communications is reduced. Further allowing the key management controller to directly interface with the CIUs, over-the-air-rekeying information can reach CIUs in the event the distribution panel malfunctions.

We claim:

1. In a secure trunking communication system that includes a central controller, a limited number of communication resources that are transceived via a limited number or repeaters, at least one console, a limited number of console interface units that couple the at least one console to the limited number of repeaters, and a distribution panel that couples the central controller to the limited number of console interface units, a method for providing communication between the distribution panel and the limited number of console interface units, the method comprises the steps of:
- a) at initial power up or upon a reset condition, transmitting a status check message from the distribution panel to each of the limited number of console interface units;
- b) receiving, by the distribution panel, an acknowledgment from console interface units of the limited number of console interface units that are active to produce active console interface units;
- c) transmitting an address for each of the active console interface units from the distribution panel to the central controller;
- d) from time to time, receiving, by the distribution panel, secure communication information from the central controller;
- e) interpreting, by the distribution panel, the secure communication information to identify at least one target console interface unit of the active console interface units;
- f) transmitting, by the distribution panel, the secure communication information to the at least one target console interface unit; and
- g) when the distribution panel fails to transmit to the active console interface units for a predetermined period of time, performing, by the active console interface units, a default secure procedure.

2. In a secure trunking communication system that includes a central controller, a limited number of communication resources that are transceived via a limited number of repeaters, at least one console, a limited number of console interface units that couple the at least one console to the limited number of repeaters, a distribution panel that couples the central controller to the limited number of console interface units, a method for each of the console interface units to communicate with the distribution panel, the method comprises the steps of:
- a) receiving, by each of the limited number of console interface units, a status check message from the distribution panel;
- b) transmitting an acknowledgment signal to the distribution panel by active console interface units of the limited number of console interface units;
- c) from time to time, receiving, by an active console interface unit of the active console interface units, secure communication information from the distribution panel;
- d) performing, by the active console interface unit, an action indicated by the secure communication information; and
- e) when the distribution panel fails to transmit to the active console interface units for a predetermined period of time, performing, by the active console interface units, a default secure procedure.

3. The method of claim 2 further comprises the steps of:
- f) receiving, by a target console interface unit, the secure communication information, wherein the secure communication information indicates an over the air rekeying procedure.

4. The method of claim 2 further comprises the steps of:
- f) from time to time, receiving, by each of the limited number of console interface units, a status check message from the distribution panel; and
- g) transmitting an acknowledgment from console interface units of the limited number of console interface units that are active to the distribution panel to produce updated active console interface units.

5. The method of claim 2 further comprises the step of:
- f) transmitting, an acknowledgement by the at least one target console interface unit to the distribution panel when the at least one target console interface unit receives the secure communication information.

* * * * *